United States Patent [19]

Rosenberger

[11] 4,349,293
[45] Sep. 14, 1982

[54] COMPOUND BLOCK KIT

[76] Inventor: Hugo Rosenberger, Alzenauer Strasse 31, D 8756 Kahl, Fed. Rep. of Germany

[21] Appl. No.: 110,554

[22] Filed: Jan. 8, 1980

[30] Foreign Application Priority Data

Jan. 11, 1979 [DE] Fed. Rep. of Germany ....... 2900852

[51] Int. Cl.³ .................... A01G 9/02; B05B 17/08; E01C 5/06
[52] U.S. Cl. ......................................... 404/41; 47/39; 47/66; 239/17; 239/289
[58] Field of Search ................ 404/41; 52/604, 606, 52/27, 40, 103, 169.13; D23/13; 47/39, 66, 82, 83, 33; 239/17, 21, 289; 46/25

[56] References Cited

U.S. PATENT DOCUMENTS

| | | | |
|---|---|---|---|
| 587,404 | 8/1897 | Schoyen | 239/21 |
| 1,621,799 | 3/1927 | March | 47/39 |
| 1,962,840 | 6/1934 | Rives | 239/17 |
| 2,095,290 | 10/1937 | Roy | 52/103 X |
| 2,513,711 | 7/1950 | Cain | 52/27 X |
| 2,577,170 | 12/1951 | Walters | 52/606 |
| 2,923,551 | 2/1960 | Pope | 46/25 X |
| 3,305,982 | 2/1967 | Steele | 46/25 X |
| 3,683,549 | 8/1972 | Simmon | 47/66 |
| 3,772,826 | 11/1973 | Ferver | 47/66 |
| 3,906,665 | 9/1975 | Medlin | 47/66 |
| 3,947,192 | 3/1976 | Rosenberger | 404/41 |
| 4,212,134 | 7/1980 | Brokamp | 47/82 |

FOREIGN PATENT DOCUMENTS

| | | | |
|---|---|---|---|
| 2230903 | 1/1974 | Fed. Rep. of Germany | 47/83 |
| 2726298 | 12/1978 | Fed. Rep. of Germany | 47/66 |
| 1505322 | 3/1978 | United Kingdom | 47/66 |

*Primary Examiner*—Rodney H. Bonck
*Attorney, Agent, or Firm*—Max Fogiel

[57] ABSTRACT

A compound block kit of edge-toothed concrete blocks, in which the compound blocks are coordinated relative to their cross-sectional shape and size and have cobblestone blocks to palisade blocks of various heights. The cobblestone compound blocks and palisade compound blocks are provided with edge-teeth extending around the entire block circumference and are engageable with one another. The similar edge-teeth prevent a relative shifting of the blocks. The identical cross-sectional shapes and sizes permits any desired insertion and exchange of compound blocks at any desired position.

21 Claims, 9 Drawing Figures

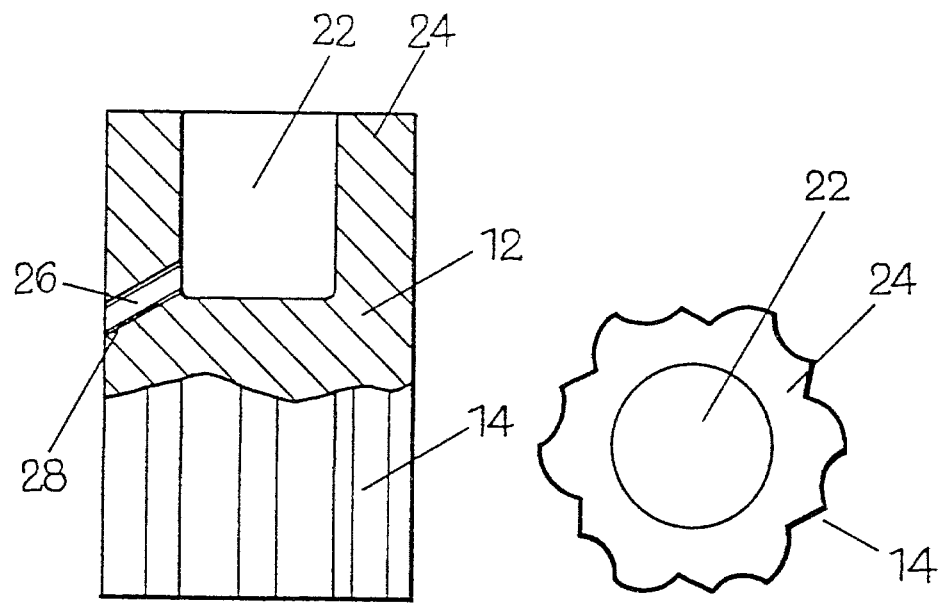
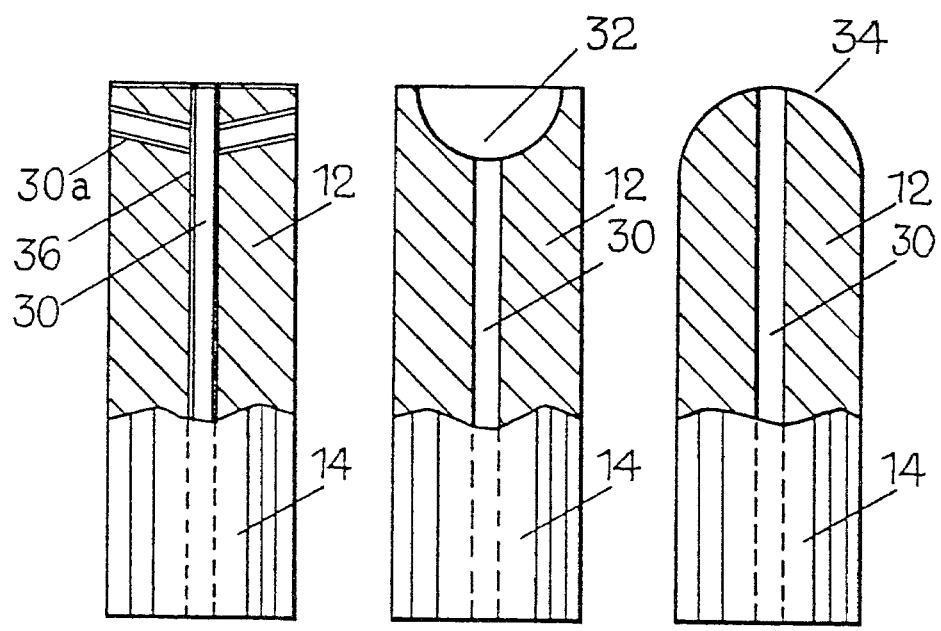

COMPOUND BLOCK KIT

BACKGROUND OF THE INVENTION

The invention relates to a compound block kit of edge-toothed concrete blocks.

Compound block kits consisting of concrete are known in many forms. Such kits are composed of concrete plaster compound blocks which have an identical or different surface area configuration as well as a uniform height and which are used to cover paths, streets, yards or the like with a continuous compound block surface. If it is desired to provide e.g. lateral borders for a thus covered surface, different elements which are not associated and cannot be engaged with the compound blocks, for example border walls, fences, palisades or the like must be used. This results in transitions from the block-covered surface to e.g. a surrounding palisade wall which are optically not particularly attractive, especially since the individual elements of such a wall are frequently only inadequately position stabilized. It must be taken into account that such palisade borders often must absorb not insignificant lateral earth thrusts, which leads to substantial supporting problems. Further, in the case of a compound block covering, it is not readily possible to integrate within the covered area other elements serving other purposes, for example in form of anti-entry bollards, and to do so in a position stabilized manner. In this context it is known to interrupt the block-covered area by removing one or more of the compound blocks and to put in their place for example a limiting concrete column, concrete rod or the like. If a particularly good position stabilization is desired, this element must be concreted in place. It is thus evident that such compound block kits are relatively limited with respect to their applicability and flexibility and that substantial problems occur if a transition from the blocks to other elements is to be made.

SUMMARY OF THE INVENTION

It is the purpose of the invention to provide a compound block kit of the type in question which on the other hand is highly variable with respect to creative possibilities while offering non-problematic position stability of the individual compound blocks within the compound, and on the other hand, is relatively light and can be produced economically.

To solve the problem it is proposed in a compound block kit of the type in question, that according to the invention it be composed of a plurality of compound blocks which are coordinated relative to their cross-sectional shape and size and have cobblestone blocks to palisade blocks of various heights and that all cobblestone blocks and palisade compound blocks be provided with edge-teeth extending around the entire block circumference and engageable with one another.

Thus, the thought behind the invention is to unite similar compound blocks of different heights to a kit and thus to open the possibility to combine cobblestone compound blocks and palisade compound blocks which are usable for the greatest variety of different applications, into an integrated position-stabilized block compound in which there are no transition problems between the compound blocks of different heights. Since the compound blocks differ essentially only by their height, they can be produced simply and inexpensively. The similar edge-teeth largely prevent a relative shifting of the blocks and because of the identical cross-sectional shapes and sizes permit any desired insertion and exchanges of compound blocks at any desired position.

The inventive compound block kit is highly versatile, and for example, it is possible to provide in a fully non-problematic manner a position stabilized palisade fence around a block-covered area, whereby due to the intimate connecting effect even lateral earth thrusts of various forces, can be absorbed without positional changes of the compound blocks. Furthermore, the higher palisade compound blocks of the kit permit the erection of any desired embankments, support walls, and fence walls which may be straight, angular or curved and have different height dimensions. Lower palisade compound blocks may for example be used as surrounds for trees, flowers, lamps, water basins and the like in position-stabilized manner. The lower palisade compound blocks may also be used to make stair steps to which they are associated at the lateral sides higher than support palisade compound blocks. It is also possible to integrate within a block-covered area lower and-/or higher palisade compound blocks in individual or adjoining manner as elements which prevent the entry of vehicles, which prevent parking or as fencing elements. For this purpose, it is simply necessary to omit a cobblestone block or to remove it and to replace it with a correspondingly higher palisade which itself is maintained in position stabilized condition by the block compound. Aside from the aforementioned possibilities of use there are many other modifications and applications, as for example for outdoor grills, benches, tables and the like. In all cases, the inventive compound block kit permits a largely freely selective and always position stabilized combining of lower and higher edge-toothed compound blocks of identical cross-sectional form and size.

While in principle other cross-section are possible, for example a quadratic form, it has been found to be particularly advantageous and esthetically pleasing to make all compound blocks of a hexagonal cross-section of essentially identical edge lengths. Compared to a quadratic shape this has for example the essential advantage that not only right angular but also inclined palisade delimitation angles are possible.

A particularly advantageous embodiment relative to the compound block teeth and thus the position stabilization is obtained if at each circumferential side of the block there is provided at least one edge tooth composed of a convex edge projection—round bar—a thereto adjoining outwardly inclined straight edge portion—rod—and a thereto adjoining concave edge recess—hollow. Such edge teeth may very easily be moved into mutual engagement during laying of the compound blocks, and assure a good position fixation of the compound blocks which in such engagement can be neither shifted nor turned relative to one another.

Basically, it is sufficient if the edge teeth extend over the height of the mutual block engagement region. For the higher palisade compound blocks this means that they need be edge toothed only in the lower area. However, to provide the manufacture as economical as possible and to make the kit as versatile as possible, it is of advantage if the edge teeth extend over the entire block height. This is in any case advantageous in the higher palisade compound blocks which for example are to be used for supporting adjacent ground and thus must have mutually position stabilizing engagement over the entire block height.

In principle the compound block dimensions may be selected at will and accommodated to the requirements of a particular application. For manufacturing and handling reasons it has been found advantageous, however, that the maximum height ratio between the palisade compound blocks and the cobblestone compound blocks is approximately 10:1 to 15:1. The palisade compound blocks of different heights may have a maximum height of approximately 100–120 cm and a minimum height of approximately 20 cm and the cobblestone compound blocks may have a height of approximately 8 cm. In the case of hexagonal compound blocks it has been found advantageous if the spacing between oppositely located hexagonal edge teeth is approximately 20 cm. These dimensions, which are preferred for many applications, may however be largely changed at will in dependance upon the particular requirements.

Preferably the palisade compound block is provided on an edge face with a depression having a circumferentially extending margin. The depression is advantageously a planting depression of round cross section and preferably has a diameter of about 10 cm and a depth of about 10–20 cm. Such a depression, provided in an edge face, permits the use of the compound blocks in one position as a normal palisade and in a position turned through 180° as a palisade with an uppermost depression which is primarily usable for planting. This has the great advantage that the block compound can be planted without the need for additional plant receptacles or bare-earth spaces. This is particularly advantageous in the case of a large palisade compound, for example if a steep incline is to be supported with several palisade rows arranged one behind another between which due to the intimate connection no interspaces remain for ground in which planting can be made. By means of the planting depressions the planting can in effect grow directly out of the palisade itself. The preferred dimensions listed for the planting depression are adequate but may be increased or decreased as required.

It is preferred that the circumferential margin of the depression for planting is provided in the region of its bottom with at least one passage. This extends preferably approximately radially outwardly and is inclined in downward direction. In this passage a venting or dewatering tube may be embedded in the concrete. The passage prevents over watering of the ground placed into the depression and permits venting sufficient for the plantings. The venting or dewatering tube need not absolutely be cast in place, but can be subsequently inserted into the passage. For many applications such a tube could be entirely omitted.

A further possibility of variation is obtained in that the palisade compound block is constructed as a fountain element and is penetrated in longitudinal direction by at least one channel opening at one of its end faces. In this manner it is for example possible to provide within a palisade compound, such as a palisade hill with differently high palisades, one or more palisades which are constructed as fountain elements and to connect them at their underside with a water supply so that the water can exit at the upper open side and for example flow off over adjacent lower palisades. In this manner very appealing water-flooded palisade hills respectively steps can be formed. If desired, passages or channels of adjacent lower palisades can be used as water draining channels.

The palisade compound block may be provided in the opening region of the channel with an end face depression or with a convex protrusion. In the case of the depression a water collecting effect occurs in the same, so that a kind of fountain is formed. If the channel is a water outflow channel, then the depression can be used as a water outflow funnel. A convex protrusion in the opening region of the channel, on the other hand, can supply for a more reliable draining-off of the water without any residual water being entrapped.

In principle it is possible for the palisade compound block to be provided with water outlet openings on its circumference also. In this manner particularly a higher palisade can be used as a fountain device which sprays in all directions. To supply the outlet at the end and/or outlets at the circumference with water, it is advantageous for a tube or hose element to be arranged in the channel. After being connected to the supply in the ground this can be inserted into the channel when the palisade is erected. It is also possible for the tube or hose element to be previously placed into the channel and to be connected on erection of the palisade with a water supply in the ground area. And finally, a tubular element can already be cast into the concrete palisade during the manufacture of the same, in which case the channel is formed without any additional means.

The inventive compound block kit is, as already explained in detail, suitable for a great many applications since different-height palisades can be integrated in many different ways in a cobblestone compound in position-stabilized manner without any transition problems. For example, the compound block kit can be used for providing fountains, plantings, tables or benches, with or without palisade bannisters, anti-vehicle boundaries, more or less dense palisade fences, palisade pyramids or hills with or without plantings, and the like, all within the context of an area covered by compound blocks. Such a compound-block covered area can also be provided with a center region serving for grill purposes and which is surrounded by palisade seats. The greatly variable block compound has a good connection not only in the region of the ground, but also in the higher block engagement region located above and constituted by palisade compound blocks. This is particularly important for palisade surrounds which are adjacent to the ground and which are prevented from sliding or turning by the compound effect.

The invention will hereafter be described in more detail with reference to several embodiments in the drawing.

BRIEF DESCRIPTION OF THE DRAWINGS

FIG. 3 is a partly sectioned side view of a palisade compound block of the kit provided in an end phase with a planting depression, FIG. 4 shows an end view of the compound block in FIG. 3, FIG. 5 is a partly sectioned side view showing another embodiment of a palisade compound block with a channel extending in longitudinal direction, FIG. 6 is an embodiment which is modified with respect to FIG. 5 and has an end phase depression provided in the region of the opening of the channel, FIG. 7 is an embodiment modified with respect to FIG. 5 and having a protrusion provided in end phase in the region where the channel opens.

DESCRIPTION OF THE PREFERRED EMBODIMENTS

Figure 1:
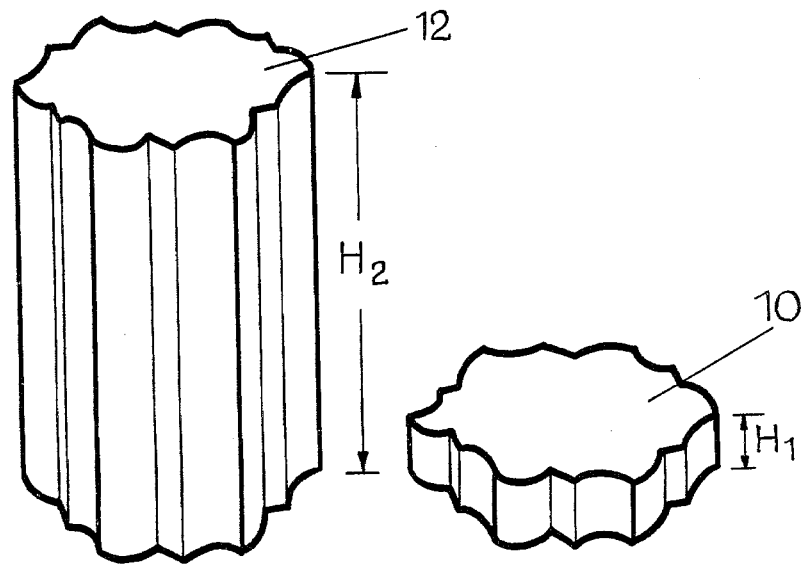
FIG. 1 is a perspective view showing two different-height compound blocks of one embodiment of the inventive compound block kit.
Figure 2:
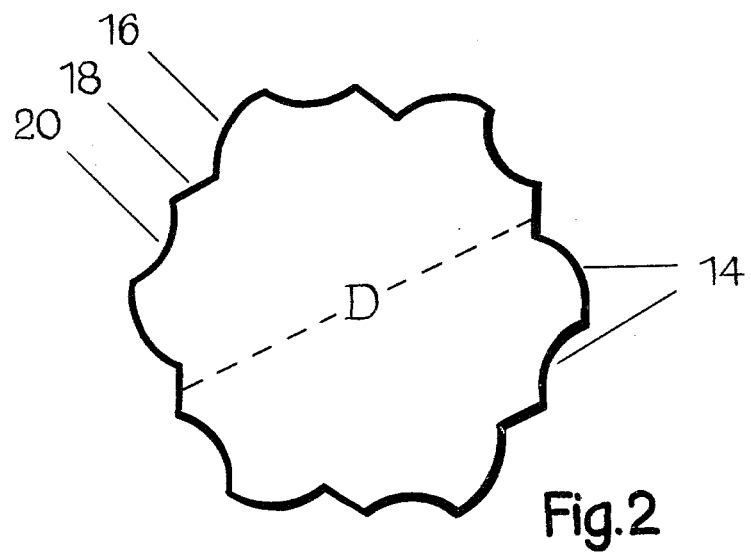
FIG. 2 shows a compound block of the kit according to the embodiment of FIG. 1 in an end view.

The compound blocks of the inventive compound block kit have, according to FIG. 1, an identical cross sectional form and size, but a different height. For reasons of simplification FIG. 1 shows only two different height dimensions, with a cobblestone compound block 10 having a lower height $H_1$ of e.g. approximately 8 cm and a palisade compound block 12 having a greater height $H_2$ of e.g. 20 cm up to approximately 120 cm. Other dimensions, particularly stepped heights of the palisade compound blocks 12, are possible. According to FIGS. 1 and 2 the compound blocks 10, 12 have a hexagonal cross sectional shape of identical-length sides, and each side of the hexagon is provided with an edge tooth 14 composed of a convex projection 16 (round rod), a thereto adjacent outwardly inclined straight edged portion 18 (rod) and a thereto adjacent concave edge depression 20 (hollow). At the edges of the block there is always an edge depression of one block side located opposite an edge projection of the adjacent block side. This assures that the hexagonal compound blocks 10 can have any desired sides placed into meshing engagement in a very simple and position stabilizing manner. The edge projections 16 of one compound block always engage in the edge depressions 20 of the adjacent compound block and the straight edge portions 18 of the compound blocks move into engagement with one another. The distance D between oppositely located edge teeth 14 of each compound block 10, 12 is approximately 20 cm according to a preferred embodiment, but even this dimension may be changed and accommodated to the requirements of a particular application.

An embodiment of the type shown in FIGS. 3 and 4 is suitable for the higher compound blocks 12, which are primarily used as palisades. It is shown that the compound block 12 is provided in one end phase with a depression 22 which is surrounded everywhere by a margin 24. This depression primarily serves for planting purposes and ground to be planted is placed into it. To avoid overwatering and/or assure sufficient venting, the lower region of the depression 22 is provided with a passage 26 extending through the circumferential border 24 and which may be defined according to FIG. 3 by a venting or dewatering tube 28. This can subsequently be inserted into the passage 26 or else may be cast into the same during the manufacture of the compound block 12. Taking into account the dimension which is preferred in connection with the spacing D of FIG. 1, the depression 22 which according to FIG. 4 is of circular cross section may, e.g., have a diameter of approximately 10 cm and a depth of approximately 10-20 cm. In this event a still sufficient material strength is obtained for the circumferential margin 24, and on the other hand sufficient space is provided for planting purposes. If desired, other dimensions may be selected for the depression 22.

FIGS. 5-7 show different embodiments of a higher compound block 12 constructed as a fountain element. In all embodiments a channel extends in longitudinal direction through the compound block 12. In the embodiment of FIG. 5 the compound block 12 has at both sides planar delimiting phases. In addition, a tube or hose element 36 is placed into the channel 30 which can be inserted after the manufacture of the compound block 12 or else can be cast into the compound block 12 during the manufacture thereof. The channel 30 respectively the tube or hose element 36 serve to guide water supplied from the underside of the compound block 12 to the upper side of the same and to let it emerge in the outlet region. In contradistinction to the embodiment of FIG. 5 the compound block 12 of FIG. 6 is provided in the upper outlet region of the channel 30 with a depression 32. When operated as a fountain element here also a hose or tube element can be inserted into the channel 30 as in FIG. 5, and may for example enter into the depression 32 or project beyond the same. The embodiment of FIG. 6 can also be used as a water run-off element, in which case the depression 32 functions as a funnel-shaped water collecting basin. In the embodiment of FIG. 7 the upper end of the compound block 12 is provided, in contradistinction to the one in FIG. 6, in the opening region of the channel 30 with a concave protrusion 34 rather than a depression 32. This permits the uniform run-off of the water emerging from the channel 30 without leaving any residues. The palisade compound block may have water outlet openings 30a in the circumferential region also.

Figure 8:
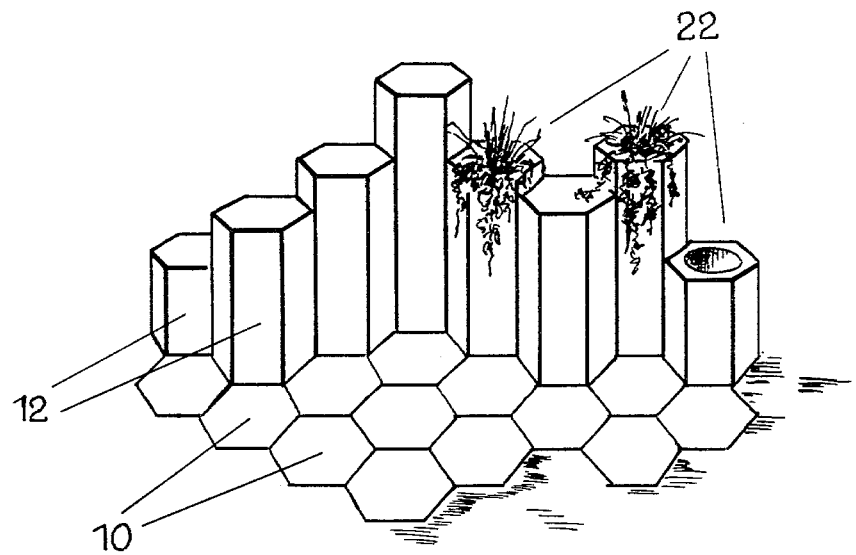
FIG. 8 is a perspective simplified view showing a block compound of compound blocks of different heights, the compounds being of hexagonal cross section and of identical length sides and being shown for purposes of simplicity without edge teeth, and with different-height palisade compound blocks delimiting an area covered with lower cobblestone compound blocks.

In FIG. 8 it is shown in an exclusively exemplary manner how low cobblestone compound blocks 10 and palisade compound blocks 12 of different height, all forming a part of the inventive kit, may be installed to form a block compound. In the present instance the palisade compound blocks 12 serve as a border for a region which is covered with cobblestone compound blocks 10. Some or all palisade compound blocks 12 may be provided at the upper end phase with depressions 22 according to FIGS. 3 and 4 and planted with plantings which hang down over the compound blocks and partially obscure them.

Figure 9:
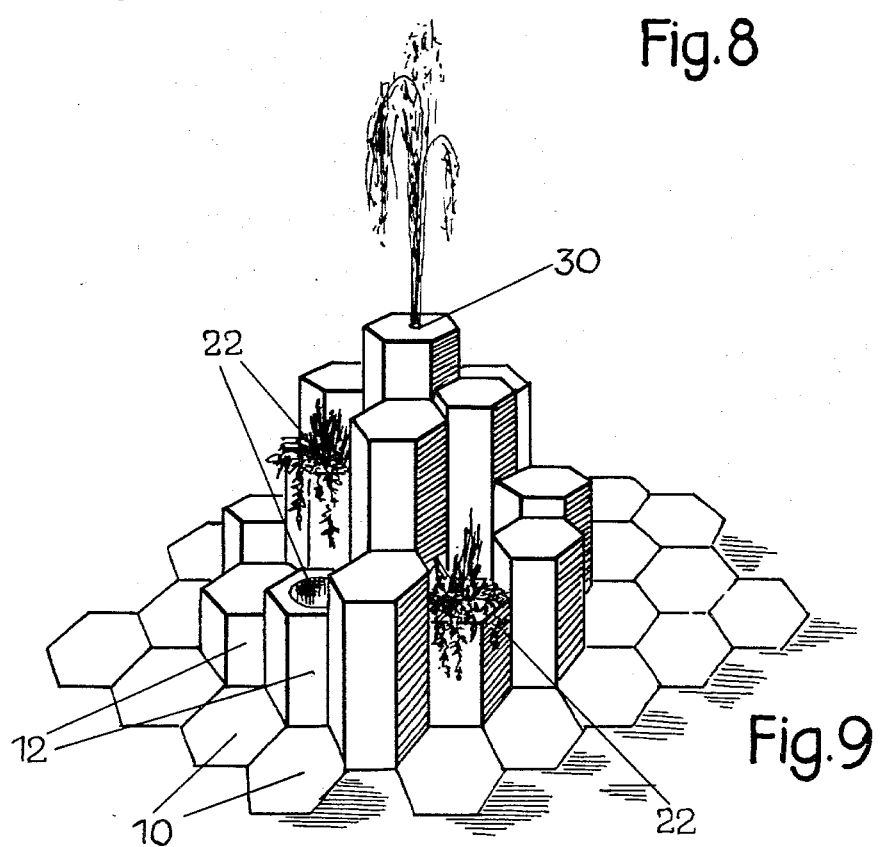
FIG. 9 is a perspective simplified view of a block compound of compound blocks in which also the individual compound blocks are shown without edge teeth for reasons of simplification and in which different-height palisade compound blocks are arranged as a palisade hill within a region which is covered with compound blocks.

FIG. 9 shows a further example of a block compound, wherein a palisade hill composed of palisade compound blocks 12 of different height is arranged within a region covered with low cobblestone compound blocks 10. One or more palisade compound blocks 12, particularly the highest compound block 12, may be constructed as fountain elements with a channel 30 according to FIGS. 5-7. The water which is supplied to the channel 30 from below can be supplied fountain-like under pressure or else largely without pressure and can run off in steps along the palisade hill in downward direction, in order to drain into the earth between the compound blocks or else to be collected at certain locations and to be conveyed away, for example with the aid of a compound block 12 according to the embodiment of FIG. 6. Other compound blocks 12 may be provided with depressions 22 for planting purposes, as is shown in FIG. 9.

Many modifications relative to the form, size, edge teeth and detail configuration are possible within the scope of the invention. What is important is that all different-height compound block of the kit are exchangeable for one another and can be intermeshed with one another. This assures multiple applicabilities for a block compound which can be erected readily but with the highest possible position stability and which can be varied at will.

Particularly advantageous results are obtained if the palisade compound blocks 12 are of tubular configuration with a closed end phase to save material, costs and weight. The tubular form can be produced by means of a removable core and be formed by the depression 22 itself which in this case, in contradistinction to the preceding explanations, has a depth that is slightly smaller than the height $H_2$ of the palisade compound blocks 12. This depression 22 may also serve for planting purposes. These substantially less costly palisade compound blocks can also be more readily transported and installed because of the lower weight.

What is claimed is:

1. Compound block kit comprising compound blocks; said compound blocks having similar cross-sectional form and size and having a height variable from the height of cobblestones to a height substantially above the surface of cobblestones corresponding to palisade height; said compound blocks having edge-teeth extending about the entire block circumference and being meshingly engageable with one another, neighboring compound blocks being meshed by engagement of corresponding edge-teeth on the block circumferences for holding the blocks firmly in place and for mutually supporting each other, meshing of neighboring compound blocks forming interlocking of the blocks to result in a homogeneous combination so that blocks at the height of cobblestones can firmly support blocks with heights substantially above heights of cobblestones.

2. Compound block kit as defined in claim 1, wherein said compound blocks have a substantially even-sided hexagonal cross-section.

3. Compound block kit as defined in claim 1, wherein at each circumferential side of the block there is at least one edge-tooth having a convex depression, and adjoining outwardly inclined straight marginal section, and a thereto adjoining concave recess.

4. A compound block kit as defined in claim 1, wherein said edge-teeth extend over the height of the mutual block engaging region.

5. Compound block kit as defined in claim 4, wherein said edge-teeth extend over the entire block height.

6. Compound block kit as defined in claim 1, wherein the maximum height ratio between said palisade compound blocks and said cobblestone compound blocks is approximately 10:1 to 15:1.

7. Compound block kit as defined in claim 6, wherein said palisade compounds blocks which are stepped in height have a maximum height up to approximately 100-120 cm and a minimum height of approximately 20 cm.

8. Compound block kit as defined in claim 6, wherein said cobblestone compound blocks have a height of substantially 8 cm.

9. Compound block kit as defined in claim 1, wherein said edge-teeth are hexagonal edge-tooth sets, the distance between oppositely located hexagonal edge-tooth sets being approximately 20 cm.

10. Compound block kit as defined in claim 1, wherein said palisade compound block has on a longitudinal end of the block a depression with a circumferentially complete margin.

11. Compound block kit as defined in claim 10, said depression being shaped as a planting depression and of round cross-section and having a diameter of substantially 10 cm and a depth of substantially 10-20 cm.

12. Compound block kit according to claim 10, wherein said circumferential margin of said depression is located in the region of its bottom with at least one passage.

13. Compound block kit as defined in claim 12, wherein said passage extends from said depression substantially radially outwardly and is inclined in a downward direction.

14. Compound block kit as defined in claim 12, wherein in said passage there is embedded in the concrete a venting dewatering tube.

15. Compound block kit comprising compound blocks; said compound blocks having similar cross-sectional form and size and having a height variable from the height of cobblestones to a height substantially above the surface of cobblestones corresponding to palisade height; said compound blocks having edge-teeth extending about the entire block circumference and being meshingly engageable with one another; said palisade compound blocks comprising fountain elements penetrated in longitudinal direction by at least one channel open at a longitudinal end of the blocks.

16. Compound block kit as defined in claim 15, wherein said palisade compound blocks have in the region of said opening of said channel a recess in a longitudinal end of the blocks.

17. Compound block kit as defined in claim 15, wherein said palisade compound blocks have in the region of said opening of said channel a convex protrusion in a longitudinal end of the blocks.

18. Compound block kit as defined in claim 15, wherein said palisade compound block has water outlet openings in the circumferential region also.

19. Compound block kit as defined in claim 15, wherein a tubular or hose element is arranged in said channel.

20. Compound block kit as defined in claim 1, wherein said palisade compound blocks are of tubular configuration to save material and weight; and wherein said palisade compound blocks have a closed end face.

21. Compound block kit as defined in claim 20, wherein said tubular configuration is defined by a depression having a depth substantially smaller than the height of said palisade compound blocks; said depression being of round cross-section having a diameter of substantially 10 cm.

* * * * *